United States Patent [19]

Gilbert

[11] 3,714,829
[45] Feb. 6, 1973

[54] PRESSURE MEASURING SYSTEM
[75] Inventor: Paul T. Gilbert, Los Altos Hills, Calif.
[73] Assignee: Beckman Instruments, Inc.
[22] Filed: June 29, 1970
[21] Appl. No.: 50,463

[52] U.S. Cl. .................. 73/398 R, 73/64.3, 73/406
[51] Int. Cl. ............................................. G01l 9/00
[58] Field of Search .......... 73/64.3, 406, 401, 398 R; 350/295; 250/210, 209

[56] References Cited

UNITED STATES PATENTS 2,597,899 5/1952 Payne .......................... 73/432
3,333,105 7/1967 Kossakowski et al. ......... 250/210
3,509,767 5/1970 Greer ........................... 73/398 R Primary Examiner—Donald O. Woodiel
Attorney—James M. Thomson and Robert J. Steinmeyer

[57] ABSTRACT

A pressure measuring system including a light source and a pressure sensitive membrane illuminated by the light source and adapted to reflect the light in a manner dependent upon the pressure being sensed. A sensor is illuminated by the reflected light and includes a photosensitive detector connected in a Wheatstone bridge circuit lacking diagonal bilateral symmetry.

27 Claims, 14 Drawing Figures

PATENTED FEB 6 1973
3,714,829
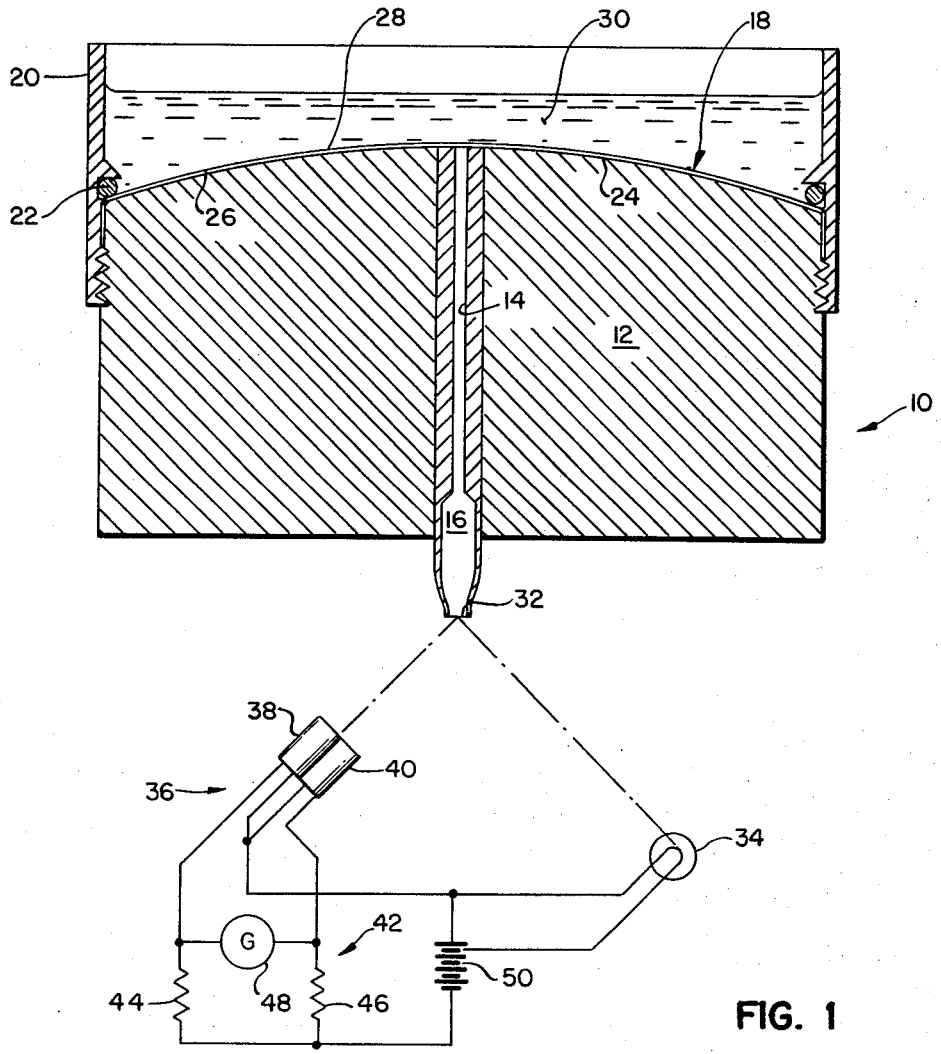
FIG. 1
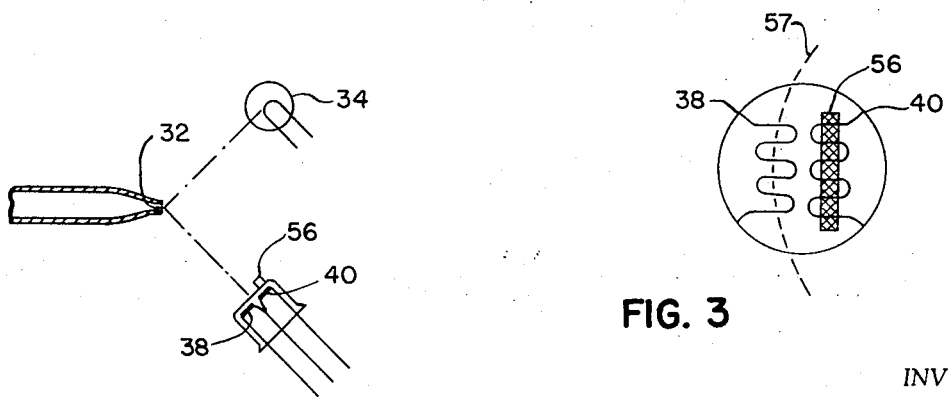
FIG. 2
FIG. 3
INVENTOR.
PAUL T. GILBERT
BY William F. McDonald
ATTORNEY

PATENTED FEB 6 1973

INVENTOR.
PAUL T. GILBERT
BY William F. McDonald
ATTORNEY

INVENTOR.
PAUL T. GILBERT

BY William F. McDonald
ATTORNEY

PRESSURE MEASURING SYSTEM

BACKGROUND OF THE INVENTION

The instant invention relates to pressure measuring systems. It is particularly applicable to optical measuring systems used to measure changes in pressure. More specifically, it is useful in connection with devices measuring the osmotic pressure of a solution.

A particularly effective device for measuring osmotic pressure is that known as the Hansen osmometer and described by A. T. Hansen in *Acta Physiol. Scand.*, 53, 197 (1961). The Hansen osmometer requires a cell having an inner space filled with a reference solvent. An osmotic membrane adapted to be in contact with the liquid solution whose osmotic pressure is to be measured. The inner surface of the membrane is in contact with the solvent. The only pressure differential felt across the membrane is the osmotic pressure differential. The osmotic pressure difference across the membrane is transmitted by the solvent to a transducer of some type and then measured.

This osmometer has attained a time constant or response time of 5 seconds by virtue of the very high elastance (stiffness) with which its parts are assembled. Fast response demands very high elastance of the cell, its contents, and the two membranes. To attain a time constant as short as 1 second in the measurement of osmotic pressure with commercially available osmotic membranes, the pressure transducer would have to have an elastance of about 10 $\mu$b/pl (microbars per picoliter). For many purposes, high sensitivity is wanted in the measurement of osmotic pressure. A sensitivity of 1 $\mu$b (microbar), which is the osmotic pressure of a solution having a concentration of 0.04 micromoles per liter can be desirable. However, a measuring system that is to respond to a pressure change of 1 $\mu$b and yet possess, for example, an elastance of 10 $\mu$b/pl (microbars per picoliter) must show a measurable response when the membrane suffers a volume displacement of only 0.1 pl (100 cubic microns).

SUMMARY OF THE INVENTION

It is an object of the invention to provide a pressure measuring system having an extremely high figure of merit, defined as the product of elastance and reciprocal pressure detection limit. The detection limit is governed by the noise level of the signal. With proper design the noise will consist largely of photodetector noise, an inherent physical limitation that cannot be circumvented. Naturally the signal must be large enough to reveal the noise. The figure of merit will have the dimensions of reciprocal volume, since elastance is expressed as pressure change per unit volume change and the detection limit is expressed in terms of pressure. A convenient unit is reciprocal picoliters, $pl^{-1}$. The figure of merit thus represents the reciprocal of the smallest volume displacement of the membrane that can be detected. It may be taken as the reciprocal volume equivalent to the rootmean-square noise of the signal. Several pressure transducers, according to the invention, having elastances of 45 to 80 $\mu$b/pl and figures of merit ranging from about 100 to 1,000 $pl^{-1}$ have been built.

Advantageously the instant invention provides a pressure transducer in which, despite very high elastance, a small pressure change generates a large signal that can be supplied directly to a potentiometric recorder or even to a simple galvanometer without intervening electronic circuitry. Transducers according to the invention can exhibit response factors of several millivolts per microbar; but such sensitivity is inconveniently great and the response factor must ordinarily be limited to smaller values.

Another advantage of the instant invention is that it provides a small, compact, and simple pressure transducer.

The instant invention provides a pressure transducer which, despite small size and high figure of merit, advantageously requires no critical dimensions or precisely machined parts and is easy to put together and to adjust.

It is a further advantage of the instant invention that it provides an optical-lever detector in which neither the zero point nor the response factor is affected by changes of brightness of the light source.

The instant invention provides a detector circuit for a photoelectric optical-lever pressure transducer that provides more sensitivity and greater figure of merit than a symmetric circuit.

The pressure measuring system according to the instant invention includes a light source and a pressure sensitive membrane illuminated by the light source and adapted to reflect the light in a manner dependent upon the pressure being sensed. A sensor is illuminated by the reflected light and includes a photosensitive detector connected in a Wheatstone bridge circuit lacking diagonal bilateral symmetry. This description of the invention and the advantages thereof will become clearer from the following detailed description taken in conjunction with the accompanying drawings.

BRIEF DESCRIPTION OF THE DRAWINGS

FIG. 1 is a schematic diagram of one embodiment of the instant invention.

FIG. 2 is a schematic partial diagram of another embodiment of the instant invention.

FIG. 3 is a schematic diagram showing a photosensitive detector useful in the practice of the instant invention.

DETAILED DESCRIPTION

Figure 4:
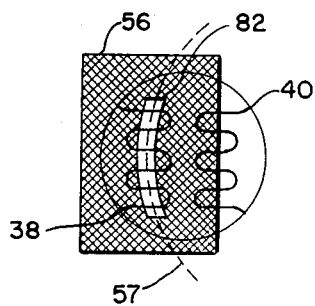
FIG. 4 shows another embodiment of a photosensitive detector.

The pressure transducer of the instant invention preferably has a small, thin, stiff, elastic diaphragm or membrane, typically 1 mm or less in diameter, that separates the fluid whose pressure is to be measured from a reference fluid, commonly ambient air. The membrane has a more or less flat, specular surface that bends inward or outward under the influence of changes of pressure. It preferably is illuminated by a small light source, e.g., a flashlight bulb, which can be quite close to the membrane. The beam reflected by the membrane passes to a detector consisting typically of a twin photoconductor forming two adjacent arms of a Wheatstone bridge, the other two arms being fixed resistors. In order to elucidate the principle of the invention, an arrangement that does not work well will first be described.

If the fixed resistors are equal and if the photoconductors are identical, the bridge is symmetric. It will be balanced only if the photoconductors receive equal illumination. In practice, this condition can be brought about by adjusting the position of one part of the apparatus — preferably the photodetector, so as not to disturb the illumination of the membrane — until balance is achieved and the meter or recorder reads essentially zero. If, moreover, the membrane is uniformly illuminated, the reflected beam will probably have a good deal of symmetry. In this case, any attempt to balance the bridge will probably result in a situation in which the photoconductors are symmetrically placed with respect to the beam; more exactly, the perpendicular bisector of the line segment joining the centers of the photoconductors will be approximately an axis of symmetry of the cross section of the beam. Any situation departing much from this, and yet resulting in equal illumination of the photoconductors, is quite improbable, as it would demand a peculiar distribution of light in the beam. Now, when the membrane bulges inward or outward under the influence of a change of pressure, it will merely cause a change in the convergence or divergence of the reflected beam. It will not necessarily cause a shift in the average position of the beam. Consequently, the photoconductors will continue to occupy positions symmetric with respect to the beam, as defined above, and they will continue to receive equal illumination, although it may differ from what it was before. The bridge will remain nearly in balance, and the change of pressure will have generated little or no signal.

Thus, an optical-lever pressure transducer with a small, stiff membrane (i.e., a membrane of very high elastance) is unlikely to exhibit more than slight sensitivity when the membrane is uniformly illuminated and the Wheatstone bridge is symmetric. Two general methods of avoiding this difficulty and imparting high sensitivity to the transducer would seem possible. In one method, which is the subject of copending application Ser. No. 50,461, the membrane is illuminated asymmetrically, e.g., on one side only, so that the illuminated area, being eccentric, will tilt when the pressure changes, deflecting the beam and causing the center of the illuminated area at the position of the photodetector to move laterally. If this lateral motion is in line with the centers of the two photoconductors, any change of pressure will in general cause one photoconductor to receive less light and the other to receive more. The bridge is thus efficiently unbalanced and a relatively large signal is produced.

This method is very effective with membranes having a diameter of about 1 mm or a little more. However, for attainment of the highest possible figures of merit, high sensitivity, approaching 0.1 $\mu$b, must be combined with the highest practical elastance, approaching 100 $\mu$b/pl. If a pressure change as small as 0.1 $\mu$b is to cause a detectable motion of a membrane of such high elastance, the membrane must be very small indeed, only a few tenths of a millimeter in diameter. It then becomes difficult, owing to the small reflecting area, to illuminate the membrane asymmetrically and it also becomes difficult, for the same reason, to make the reflected beam bright enough to activate the detector efficiently. Moreover, any attempt to illuminate the beam asymmetrically would sacrifice flux in the reflected beam. As the flux diminishes, the relative shot noise and photodetector noise rise. The noise limits the pressure detection sensitivity. This limitation can be circumvented only by increasing the time constant or time of observation. However, in some of the applications for which the invention is useful, rapid response is wanted. A premium is therefore placed upon the flux in the reflected beam.

The second method, which is the subject of the present invention, is exceptionally effective with the smallest membranes, providing very high sensitivity in conjunction with very high elastance, and it remains advantageous with larger membranes. The invention functions in the following manner. Whereas a symmetric bridge with two photocells, as described above, requires equal illumination of the two cells for balance, an otherwise similar but asymmetric bridge can be balanced only if the two photocells are unequally illuminated. A uniformly illuminated membrane will, as mentioned earlier, generally reflect a beam having some degree of symmetry in the distribution of light intensity. But when the photocells are to be unequally illuminated they cannot be placed symmetrically with respect to the beam. To balance the bridge, the beam must fall asymmetrically upon the photocells. If now the pressure changes, the distribution of illumination will change in a symmetric manner. The beam may expand or contract; or it may become brighter in the center or in an outer annular area. The bridge will remain balanced only if the ratio of fluxes received by the two photocells remains unchanged, which is a special and improbable condition. Whereas in a symmetric system with uniformly illuminated membrane and symmetric balanced bridge a change of pressure causes a symmetric shift of illumination, leaving the photocells under equal illumination, with an asymmetric bridge it is improbable that the ratio of fluxes received by the photocells should remain constant, no matter where they are placed. In general, the ratio will change, unbalancing the bridge and generating a signal. This occurs despite the fact that, as is well known, the sensitivity of a Wheatstone bridge to unbalance is greatest when the resistances of all four arms are equal. The loss of sensitivity to unbalance caused by the deliberate introduction of asymmetry is very greatly overbalanced by the phenomenon described above.

Working with small, uniformly illuminated membranes and a symmetric but adjustable photodetector bridge, a great increase in response factor (expressed in mv/$\mu$b) has been observed as the bridge is made progressively less symmetric, e.g., by making the resistances of the fixed resistors increasingly unequal. Indeed, although it may be difficult to achieve an adequate response factor with very small membranes and symmetric bridges, it becomes difficult to find an adjustment that yields a small response factor when the bridge is made asymmetric. Almost any adjustment that balances the bridge will result in a generous response factor. It is so easy to attain extreme sensitivity with an asymmetric bridge that for most purposes the asymmetry must actually be limited to a relatively modest degree.

The above explanation describes the principle of operation of some of the most effective embodiments of the invention, but there are other useful embodiments in which the principle is somewhat different, as will appear in the descriptions of some of the figures. To characterize all embodiments of the invention with a single criterion, the following definition is offered. The invention consists of an optical pressure-measuring system comprising a light source, a desirably small pressure-responsive specular membrane illuminated by the light source, and a light-detecting device or sensor illuminated by the light reflected from the membrane and including at least two photoconductors constituting arms of a Wheatstone bridge such that when the bridge is balanced a schematic diagram of the bridge is not topologically symmetric about both of the lines drawn through the pairs of opposite points of connection of adjacent resistors. In other words, the bridge lacks diagonal bilateral symmetry. The asymmetry resides in at least one of the following characteristics: (a) the numerical values of the resistances in the four arms; (b) the numerical values of the light fluxes received by the active areas of the photoconductors; (c) the nature of each resistor with reference to its being a fixed resistor, a photoconductor receiving light reflected from the membrane, or a photoconductor receiving light by another route.

The above definition, for simplicity, refers to a bridge consisting of resistive elements. But the invention is not to be considered as limited to photoconductors. The same principle is applicable to other photosensitive detectors consisting of bridge circuits including nonresistive elements such as phototubes (photoemissive cells), multiplier phototubes, or photovoltaic cells.

To recapitulate, the pressure transducer or measuring system has a small elastic diaphragm or membrane, typically between 1 and 0.1 mm in diameter, with a more or less flat, specular surface. It may be a conventional solid membrane or a liquid surface restrained by surface tension as described in my copending application Ser. No. 50,462. A small light source illuminates the membrane, which reflects a beam to a photodetector. A change of pressure alters the shape of the membrane and hence the shape of the reflected beam and the distribution of light intensity in it. The detector consists usually of two or four small photoconductors in a Wheatstone bridge, so arranged that, if initially balanced, the bridge will be unbalanced by a small shift in the distribution of light in the reflected beam reaching the detector. The shift of light distribution most effectively unbalances the bridge, generating a signal, if the bridge is asymmetric in some respect. That is, an asymmetric bridge gives a larger signal per unit pressure change than the equivalent symmetric bridge.

In one example, the bridge consists of a twin photocell one side of which is partly masked, together with equal resistors forming the other two arms; at balance the masked photocell must receive stronger illumination than the unmasked side. In a second example, the bridge consists of an unmasked twin photocell together with two unequal resistors; at balance the photocell next to the smaller resistor must be more strongly illuminated. In a third example, there are two photocells in opposite rather than adjacent arms of the bridge, physically close together and exposed to the reflected beam, while the other two arms are fixed resistors. Here the change in illumination should be in the same direction on both photocells for best response. In a fourth example, all four arms of the bridge are similar photocells, A, B, C, and D, arranged as two twin photocells AB and CD placed close together so that the reflected beam strikes all four photocells. In the bridge, A and D are in adjacent arms and B and C are in adjacent arms; but the photocells themselves are so placed that A is close to C and B is close to D. Further, two photocells in opposite arms, e.g., B and D, may be partly masked; this asymmetry requires, for balance, a disparity of illumination of the four photocells. This fourth example combines the advantages of the first and third, and it confers an additional characteristic, viz., compensation against change of brightness of the light source. Such compensation can be conferred upon any two-photocell bridge, symmetric or asymmetric, by replacing the two fixed resistors with two photocells and exposing them to light emanating from the light source but not reflected from the membrane. If these latter photocells are unequally illuminated, an asymmetry is introduced in the manner of the second example above, while compensation for variation of source brightness is retained.

Turning to FIG. 1 we see a typical pressure measuring system according to the instant invention. The system is shown attached to an osmometer. As may be seen, the osmometer 10 includes a cell 12 having an inner space 14 filled with a reference solvent 16. A suitable osmotic membrane 18 is rigidly fitted to cell 12 as by cap 20 and O-ring 22. As shown, membrane 18 is disposed over the generally spherical surface 24 of cell 12 in such a way that solvent 16 is in contact with the entire inner surface 26 of the membrane. The other side 28 of osmotic membrane 18 is in contact with the liquid solution 30 whose osmotic pressure is to be measured. Solvent 16 presses against a pressure sensitive membrane 32 which is shown sealed against space 14. A light source 34 is arranged so as to illuminate pressure sensitive membrane 32. Pressure sensitive membrane 32 is deflected in response to the osmotic pressure in solution 30 either inwardly or outwardly, normally inwardly. The arrangement is such that the membrane 32 will reflect the light from light source 34 in a manner dependent upon the pressure being sensed to a sensor or detector circuit indicated generally at 36. Sensor 36 includes at least two photosensitive detectors, e.g. photocells 38 and 40 connected in a Wheatstone bridge circuit 42. The Wheatstone bridge circuit also includes two fixed resistors 44, and 46 and a galvanometer 48 is connected across the bridge for measurement purposes. The bridge is connected to a suitable source of power 50. The light source 34 is shown connected to the same power supply but alternately may be connected to a different power supply.

The bridge can be made asymmetric by using photosensitive detectors of unequal sensitivity or resistors unequal in value. Asymmetry can also be achieved as shown in FIG. 2 wherein the photocells 38 and 40 are identical, constituting the two halves of a twin photocell having three leads, one being common to both photocells. One of the photocells is partly obstructed by a shield 56, for example, a narrow strip of opaque tape stuck to the face of the photocell. If the resistors 44 and 46 are equal, the shielded photocell 40 must be more strongly illuminated to balance the bridge, since its exposed photosensitive surface is smaller in area than that of the unshielded photocell 38.

FIG. 3 shows the face of the twin photocell of FIG. 2 with a narrow mask or shield 56 across one side. The photoconductive elements 38 and 40 are shown as sinuous bands, a form commonly used in commercial photocells to minimize resistance. By way of illustration, the edge of the circular patch of light or cross section of the reflected beam is shown by the dashed curve 57. If the patch is of more or less uniform brightness, the bridge will be balanced when the edge 57 lies across the unobstructed photocell 38. In this case the uncovered area of the fully illuminated but masked photocell 40 will be roughly equal to the illuminated area of the unmasked but partially illuminated photocell 38. If now a change of pressure causes the patch of light to expand, the edge 57 will move to the left but at the same time the patch will grow dimmer, i.e., the flux per unit area will diminish. Photocell 40 will then receive less flux, but photocell 38 will receive more because a larger fraction of it is now illuminated, and the increase in illuminated area outweighs the dimming. This illustrates one mode of action of the invention, by virtue of which the asymmetry of the bridge causes an efficient unbalancing with change of pressure and hence a large pressure response factor.

FIG. 4 shows a more efficient method of masking a twin photocell to provide the asymmetry. As in FIG. 3, the edge of the beam 57 is shown lying across photocell 38. The mast 56 covers most of photocell 38. The curvature of the slit matches that of the edge of the beam. At balance, the edge 57, for example, will lie along the middle of the slit 82. If the beam expands with a change of pressure, the edge 57 advances across the slit, so that a larger area of photocell 38 receives light. The function of the curved slit is to limit exposure of photocell 38 to that region of the beam in which the gradient of illumination and the rate of change of illumination with pressure are greatest, while shielding photocell 38 from the region of the beam (to the right of the slit) in which the illumination is more uniform and changes less with pressure. Although the magnitude of the change of illumination of each photocell with a given change of pressure may be approximately the same in the arrangements of FIGS. 3 and 4, the total illumination is smaller with the mask of FIG. 4, and therefore, the relative change of illumination — more precisely, the ratio of the algebraic difference of the changes of illumination on the two photocells to the total illumination — is greater than in the case of FIG. 3. The result is a greater response factor. Even if the beam has an indistinct edge and its brightness varies gradually or irregularly from point to point, the above-described principle remains partially operative.

Figure 5:
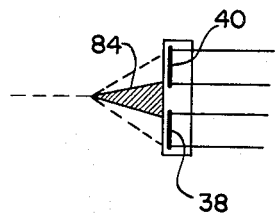
FIG. 5 shows an alternate arrangement of a photosensitive detector.

Another way of achieving the desired asymmetry is shown in FIG. 5. A wedge-shaped double mirror is positioned to split the reflected light between the photosensitive detectors 38 and 40. The mirror can be positioned so as to distribute the light between the two photocells in any desired manner. For example, it may send a larger area of the beam to one photocell than to the other. To balance the bridge, the average brightness in the larger area of the beam must therefore be lower than that in the smaller area.

Figure 6:
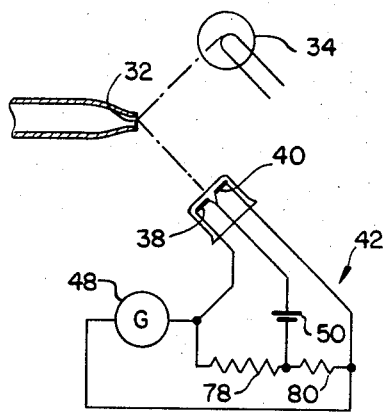
FIG. 6 is a schematic diagram of another embodiment of the instant invention.

In the embodiment shown in FIG. 6, the photocells 38 and 40 are halves of a twin photocell and are fully exposed, but the resistors 78 and 80, constituting adjacent arms of the bridge, are unequal in value. The photocell adjacent to the larger resistor must receive a smaller flux than the other photocell when the bridge is balanced. It will be seen that this kind of asymmetry has the same effect as the asymmetry illustrated in FIGS. 2, 3, 4 and 5.

Figure 7:
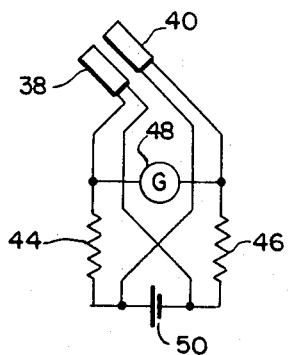
FIG. 7 is a schematic partial diagram of another embodiment of the instant invention.
Figure 10:
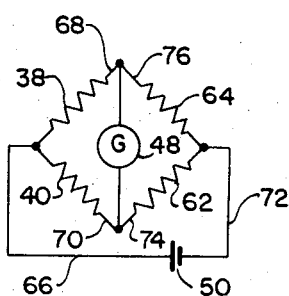
FIG. 10 is the same as FIG. 9 showing only the circuitry.

The embodiment shown in FIG. 7 is similar to that of FIG. 1 but photocells 38 and 40 are connected in opposite rather than adjacent arms of Wheatstone bridge 42. The photocells are placed side by side so that both receive the light reflected from the membrane. The remaining two arms of the bridge are fixed resistors 44 and 46. In this embodiment the photocells can be identical and the resistors equal. However, the bridge is asymmetric in the sense defined above: it is not symmetric about the lines drawn through opposite points of connection in a conventional schematic representation (like FIG. 10) displaying the bridge as a square. To achieve response to pressure, the photocells are positioned so that the change in illumination due to the pressure change being sensed is in the same direction (though not necessarily equal) one both photocells. For example, if both photocells receive more light, the resulting reduction of resistance in each photocell causes an unbalance that adds to that due to the reduction of resistance in the other, since they are in opposite arms of the bridge.

Figure 8:
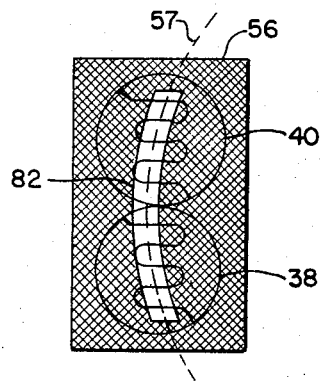
FIG. 8 shows another embodiment of a photosensitive detector.

FIG. 8 shows the faces of the juxtaposed photocell 38 and 40 of the embodiment of FIG. 7, with the addition of a mask or shield 56 having an opening or slit 82 therein, exposing a part of the photosensitive area of each photocell, and shaped to follow a line of constant illumination, e.g., the edge of the beam 57. It will be understood that the photocells and the reflected beam must be deliberately positioned relative to each other to achieve this relationship between the slit and the contours of the beam. A randomly selected position that happens to balance the bridge will not in general be satisfactory. With proper positioning, the slit 82 will function in the same way as in FIG. 4, and the change of illumination due to a pressure change will be in the same direction on both photocells.

Although the embodiment of FIG. 7 can yield a very high response factor, it has two drawbacks. The detector must be carefully positioned in the beam so that both photocells will experience rapid changes of flux with changes of pressure, and in the same direction. In the case of the detector of FIG. 2, almost any adjustment that balances the bridge will result in a large response factor. However, the detector of FIG. 7, if the photocells are identical and the resistors equal, can be readily adjusted in the beam so as to balance the bridge without yielding a large response factor. It is true that this drawback can be removed by making the resistors or photosensitive areas unequal, but to do so would not correct the second drawback, lack of compensation for drift. In most of the embodiments described in this application, each photodetector and each resistor is mated with a similar photodetector or resistor, respectively, in an adjacent arm of the bridge. Such a bridge is compensated, to a good approximation, against drifts due to thermal effects, fatigue under illumination, or hysteresis. Such a drift in any element of the bridge is balanced and canceled by the corresponding drift in the similar element in an adjoining arm. In the circuit of FIG. 7, the effect of such drifts is additive, not subtractive, and cancellation does not occur. Nevertheless, despite these drawbacks, the system of FIG. 7 can give very good performance, attaining the principal objects of the invention.

Figure 9:
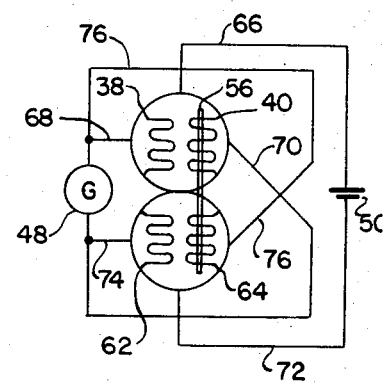
FIG. 9 is a schematic diagram of another embodiment of the instant invention.

FIG. 9 shows a pressure transducer circuit that is essentially a combination of the features characterizing the embodiments of FIGS. 2 and 7. The detector consists of two similar, juxtaposed twin photocells, shown facing the reader with the associated circuitry shown schematically around them. The two elements 38 and 40 of one twin photocell constitute adjacent arms of the bridge, and the two elements 62 and 64 of the other twin photocell likewise constitute adjacent arms of the bridge. Spatially adjacent elements in different twin photocells constitute opposite arms of the bridge. Adjacent elements 38 and 62 belong to opposite arms, and similarly adjacent elements 40 and 64 belong to opposite arms. This circuitry is shown more plainly in FIG. 10, which is wholly schematic, whereas FIG. 9 shows the elements in their correct spatial positions. The common lead 66 of the twin photocell 38, 40 and the common lead 72 of the twin photocell 62, 64 are connected to battery 50 to excite the bridge. The other lead 68 of element 38 and the other lead 76 of element 64 are joined together and are connected to one terminal of the galvanometer or potentiometric recorder 48, while the other lead 70 of element 40 and the other lead 74 of element 62 are similarly joined and connected to the other terminal of the instrument 48. The circuit is equally functional if reversed, i.e., if the positions of the battery 50 and the readout instrument 48 are interchanged. Mask 56 is used to obstruct a part of the photosensitive area of each of two photocells in opposite arms, i.e., elements 40 and 64, which, as mentioned, are spatially adjacent. The mask 56, obstructing a part of half of each of the twin photocells, provides asymmetry of the same kind as that of the embodiment shown in FIG. 2, and functions in the same manner as it does in that embodiment, in each of the two twin photocells. Furthermore, the mutually reversed arrangement of the two twin photocells, whereby spatially adjacent photosensitive elements belong to opposite arms of the bridge, provides asymmetry of the same kind as that of the embodiment shown in FIG. 7, and functions in the same manner as it does in that embodiment, in each of the two pairs of spatially adjacent but electrically opposite elements. Thus the action of the asymmetric bridge of FIG. 2 is doubled, and the action of the reversed bridge of FIG. 7 is likewise doubled. These two doublings are not multiplicative, however, and the signal is not quadrupled. The arrangement of FIG. 9 has the advantage of that of FIG. 2, expounded in connection with FIGS. 3 and 4, whereby almost any spatial adjustment within the reflected beam that balances the bridge will result in a large pressure response factor.

The arrangement of FIG. 9 has a further advantage. Ideally, the signal generated by a pressure transducer should be related only and uniquely to the pressure being measured. However, in a transducer employing photocells, the signal may drift owing to temperature drift, fatigue of the photocells under illumination, hysteresis under changes of illumination, and fluctuations of light source intensity. A change in source intensity will also change the pressure response factor or scale factor or sensitivity. A detector bridge having two similar photocells in adjacent arms, like that of FIG. 2, is compensated for temperature, fatigue, and hysteresis; but variation of source intensity will affect the response factor and in general will also shift the zero point or point of balance. Variations of source intensity can be avoided by supplying the source with sufficiently well regulated power, but it may be somewhat difficult and costly to do so. The power supply may also be bulky. The detector of FIG. 9, having four photocells, is compensated not only for temperature, fatigue, and hysteresis, but also for changes of light source intensity. The pressure response factor and the zero point become independent of the source intensity. This is an important advantage. It alleviates the requirement of precise regulation of the power supplied to the lamp, making it possible to operate the transducer with the smallest and simplest kind of power supply, e.g., a small transformer or flashlight battery. Indeed, a four-photocell bridge should operate satisfactorily with a light source consisting of ambient light only, e.g., outdoor skylight or sunlight or indoor illumination, provided the illumination can be directed toward the membrane in such a way, for example through an optical fiber, as to generate a narrow reflected beam of sufficient intensity. Compensation for source intensity variation is fully effective only if the readout instrument 48 has an effective resistance that is large compared to the resistances of the arms of the bridge. This condition prevails when a potentiometric recorder is employed to display the signal.

The reason for this compensation may be seen by reference to the equation giving the voltage V across the readout instrument 48 having resistance $R_o$ in a Wheatstone bridge consisting of four resistors $R_1$, $R_2$, $R_3$, and $R_4$, connected in series as named, and excited by a voltage $V_o$:

$$V = \frac{V_0(R_2R_3 - R_1R_4)}{(R_1+R_3)(R_2+R_4) + R_2R_3(R_1+R_4)/R_0 + R_1R_4(R_2+R_3)/R_0} \quad \text{(i)}$$

When $R_0$ is relatively large, this equation reduces to $$V = V_0(R_2R_3 - R_1R_4)/(R_1+R_3)(R_2+R_4). \quad \text{(ii)}$$

In a photocell with linear response, R is inversely proportional to the light flux. However, linearity is not necessary, provided all four photocells, being of the same kind, have the same degree of nonlinearity within the range of illumination encountered. Assume that the resistance of each photocell is given by $R = 1/kF^s$, the constant $k$ being the same for each, F the light flux (e.g., in photons/sec), and s the nonlinearity constant or "logarithmic slope." Commercial photocells commonly conform to such an equation. When this substitution is made in the equation for V, $$V = V_0(F_1{}^s F_4{}^s - F_2{}^s F_3{}^s)/(F_1{}^s + F_3{}^s)(F_2{}^s + F_4{}^s), \quad \text{(iii)}$$

where $F_1$, $F_2$, $F_3$, and $F_4$ are the fluxes on the four photocells. To show that V is independent of the brightness of the source light, let B represent its total flux. Each flux F will be proportional to B, since all the photocells receive light only from the one source. Therefore, $F_1 = a_1B$, $F_2 = a_2B$, etc., where $a_1$, $a_2$, etc., are constants characteristic of any particular spatial adjustment of the detector with respect to the reflected beam. If these substitutions are made in equation iii, and if the equation is then differentiated with respect to B, it will be found that $dV/dB = 0$. In other words, the voltage registered by the potentiometric recorder is independent of the brightness of the lamp, whether the voltage is zero or not zero; that is, neither the zero point (point of bridge balance) nor the pressure response factor is affected by the lamp brightness, when the bridge consists of four photocells of similar linearity characteristics, all illuminated by the same source.

Figure 11:
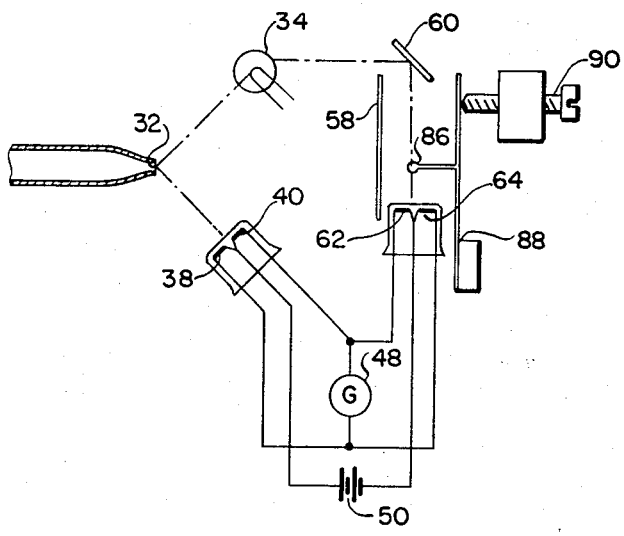
FIG. 11 shows another embodiment of the instant invention.

FIG. 11 shows another embodiment of the pressure transducer with four photocells, which confer compensation for source brightness variation. It can also be looked upon as a variant of the arrangement shown in FIG. 9 wherein the four photosensitive detectors are arranged in two groups and one group is shielded from light reflected from the membrane and exposed to light from the light source. The two "active" photocells 38 and 40, exposed to the reflected beam, which varies with pressure, are in adjacent arms of the bridge and constitute the two halves of a twin photocell. The two "inactive" photocells 62 and 64 likewise form the halves of a similar twin photocell, exposed to light from the source 34 reflected from a diffuse reflector 60, e.g., a piece of white cardboard illuminated directly by the source 34; this light does not vary with pressure. A shield 58 ensures that photocells 62 and 64 receive light only from the reflector 60. The total amount of light reaching photocells 62 and 64 can be controlled by adjustment of the reflector 60. The ratio of the light fluxes reaching these two photocells is controlled by means of a fine adjustment obstacle 86 attached to a fulcrum 88, the position of the obstacle above the photocells being adjusted by means of a screw system 90.

The obstacle 86 has two functions. Firstly, it can make the fluxes received by photocells 62 and 64 unequal, thus imparting the desired asymmetry. Secondly, fine adjustment of the obstacle by means of the screw 90 can serve to zero or balance the bridge after coarse adjustment has been effected by properly positioning the detector with respect to the reflected beam. If the obstacle 86 is small, zero control can be made very delicate even with a coarse screw system 90.

Another advantage of the transducer of FIG. 11 is the following. The four photocells of FIG. 9 must all receive light from the reflected beam, and in a small system it may be difficult to bring this about. In any case, it may be difficult to arrange the four photocells so that each will get enough light for efficient operation and suppression of shot noise. In the system of FIG. 11, only two photocells are placed in the reflected beam. Spatial limitations are less stringent, and the photocells can be placed more efficiently so as to achieve balance without sacrifice of light flux. Meanwhile the inactive photocells 62 and 64 receive light from the source by another route, in which the limitation is much less stringent. Their illumination can easily be kept high.

Figure 12:
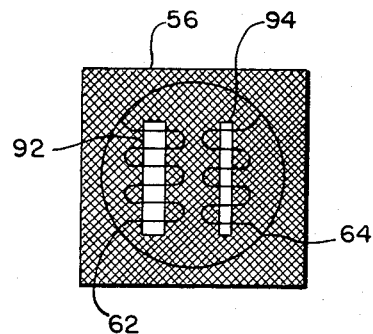
FIG. 12 shows another embodiment of a photosensitive detector useful in the practice of the instant invention.

It is further possible to impose asymmetry upon the active photocells 38 and 40 by means of a mask like those illustrated in FIGS. 3 and 4, in addition to or instead of the asymmetry imposed upon the inactive photocells by means of the obstacle 86. Alternatively, unequal areas of the photosensitive detectors 62 and 64 in the shielded group may be exposed to the light, for example, as shown in FIG. 12 by using a shield 56 having two openings 92 and 94 therein of different sizes. The system of FIG. 11 is thus quite versatile and flexible and provides compensation for lamp brightness. It lacks the doubling of the signal characteristic of the bridge of FIG. 9. However, any of the embodiments of the invention easily provides such large response factors that the absence of the doubling effect in the embodiment of FIG. 11 is outweighed by its other advantages.

Figure 13:
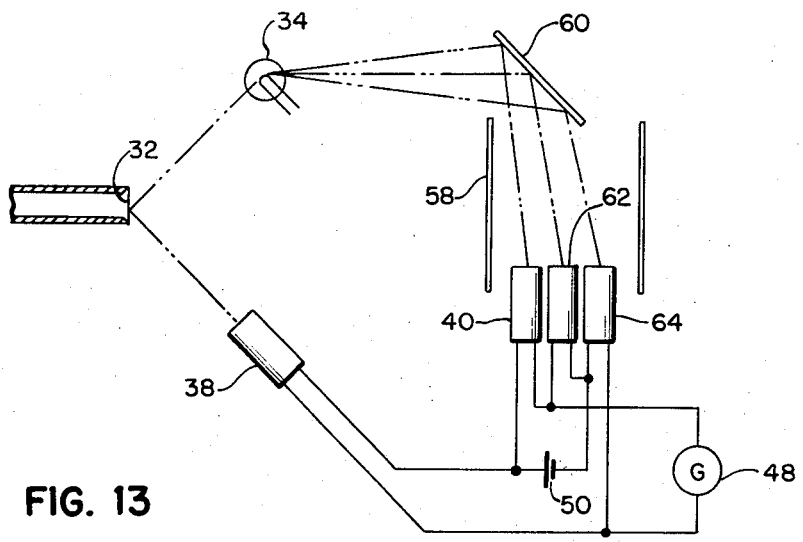
FIG. 13 shows another embodiment of the instant invention.

FIG. 13 shows another embodiment of the pressure transducer with four photocells. It resembles the arrangement of FIG. 11 except that the numbers of photosensitive detectors in the shielded group and the unshielded group are unequal. Photocell 38 is exposed to the beam reflected from membrane 32 and the other three inactive photocells, 40, 62, and 64, constituting the remaining arms of the Wheatstone bridge, are shielded from light reflected from membrane 32 and exposed to light from light source 34 reflected from diffuse reflector 60. Shield 58 ensures that the inactive photocells receive light only from reflector 60. In this embodiment the four photodetectors may receive equal illumination. The asymmetry of the bridge resides in the fact that only one of the four photodetectors is exposed to light that varies with the pressure being sensed, which satisfies the definition of asymmetry given above.

There is a particular advantage to a Wheatstone bridge consisting of four photocells all receiving light from the same source. As mentioned earlier, a Wheatstone bridge is most sensitive to unbalance when the four arms have equal resistance. That is, a 1 percent change in one of the resistances gives the largest signal on the null meter 48 when the arms are initially equal. This sensitivity to unbalance, inherent in the bridge circuit itself, is to be distinguished from the sensitivity to pressure or pressure response factor of the complete transducer. However, the overall pressure response factor necessarily contains the unbalance-sensitivity of the bridge circuit as a subsidiary factor. If the bridge must be asymmetric with respect to the resistances of the arms, the best sensitivity results from making the arms equal by pairs. If two of the resistors are fixed and two are photocells, and the four resistances are initially equal, any considerable change of the average illumination of the photocells will diminish the sensitivity of the bridge to unbalance by spoiling the above-defined equality. In practice, the fixed resistors might have to be replaced by others to retain adequate sensitivity. However, if all four resistors are photocells receiving light from the same source directly or indirectly, and if their resistances are initially all equal or, in case asymmetry is desired, if they are equal by pairs, then any change of source intensity alters all of the resistances proportionally, leaving the equality unaltered. Thus the sensitivity of the bridge to unbalance, whether it is symmetric or asymmetric, can remain maximal and independent of the intensity of the source.

It must be pointed out that the various kinds of compensation discussed above are never perfect. The pressure transducers of the present invention are so sensitive that drifts and fluctuations can always be made evident, superposed upon the basic noise due to shot noise or photodetector noise and pressure fluctuation. These instrumental drifts and fluctuations result from lack of absolute identity of the photocells with respect to sensitivity, dark resistance, response speed, linearity, and other characteristics that may affect their performance. In a four-photocell bridge, imperfect compensation against fluctuation of source intensity with respect to zero point and response factor may result from an insufficiently high resistance $R_o$ of the readout instrument, imperfect matching of the linearity exponents s of the four photocells, or dark conductances that are an appreciable fraction of the total conductances. These effects are not allowed for in equation iii, and they vitiate the conclusion that $dV/dB = 0$. In short, while the use of four photocells greatly diminishes the quantity $dV/dB$, it does not necessarily always diminish it to an imperceptible value.

Figure 14:
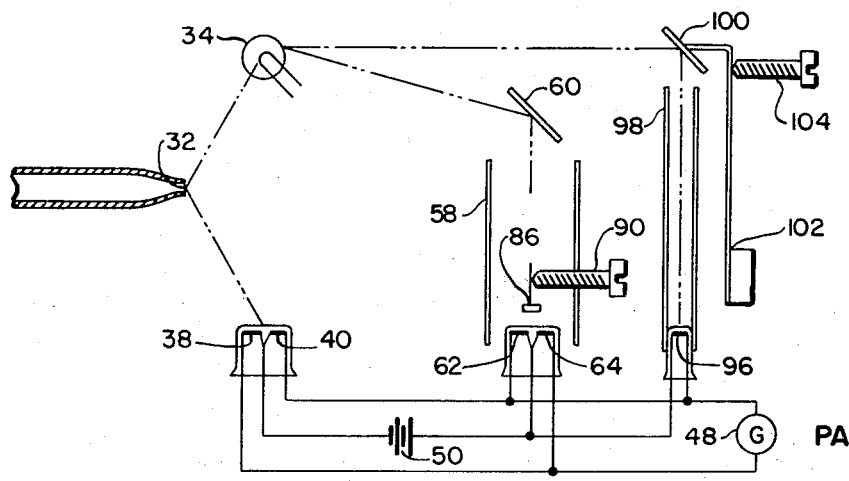
FIG. 14 shows another embodiment of the instant invention.

Second-order compensation can be superposed upon the means of first-order compensation discussed above in many ways to further diminish drifts and sensitivity to source brightness. An example is shown in FIG. 14. The pressure transducer of FIG. 14 is like that of FIG. 11 except for the addition of a fifth photocell 96 which in this example is connected in parallel with the inactive photocell 62. Photocell 96, which may be like or unlike the other photocells, is exposed to light from the source 34 reflected from a diffuse reflector 100 resembling the reflector 60 and shielded by a barrier 98 resembling the barrier 58. There are many possible ways of controlling the light received by photocell 96. As shown, for example, the reflector 100 is mounted flexibly on a fulcrum 102 and positioned by means of an adjusting screw 104. Since photocell 96 is in parallel with photocell 62, control of the light reaching photocell 96 can be employed in addition to or instead of the other means of imparting and controlling asymmetry and adjusting the zero point that have been described in connection with FIG. 11. In FIG. 14 the obstacle 86 is shown alternatively controlled by the direct action of screw 90. This arrangement may be simpler but less sensitive than that shown in FIG. 11. However, screw 104 can provide fine adjustment of the zero point while screw 90 provides coarse adjustment. The chief function of photocell 96 and its associated controlling apparatus is to reduce or eliminate any residual lack of compensation for variation of source brightness that may reside in the system of FIG. 11. In the attempt to do this, the auxiliary photocell can be connected experimentally in series or in parallel with any of the arms of the bridge or in any other manner that has the desired effect.

It will be obvious that the various aspects of the present invention can be combined in many ways other than those specifically described above. For example, any of the masks or shields 56 can be applied to any of the photodetectors, active or inactive. Small mirrors can be used to control the light reaching any photodetector. While the Wheatstone bridges described in connection with the figures consist of resistive elements such as photoconductive cells, these can be replaced with nonresistive elements such as phototubes, photomultipliers, or photovoltaic cells, by way of example and not limitation. If the photodetectors to be used are larger than the small photoconductors mentioned in the examples, the reflected beam can be caused to fall upon a mirror that sends a part of the beam to one photodetector and another part to another photodetector. The pressure-sensing membrane may be either solid or liquid but preferably not larger than 3 mm in diameter. The compensation for source intensity resulting from use of four (or more) photodetectors in the bridge permits use of the pressure transducer without a built-in light source, depending instead upon ambient light as discussed above. Such a transducer requires only a very small battery to excite the bridge and can be made very small and portable. It can be used in radiosondes or rockets and in biotelemetry with persons or animals.

While there have been shown and described hereinabove certain embodiments of this invention, it is to be understood that the invention is not limited thereto and various changes, alterations, and modifications can be made thereto without departing from the spirit and scope thereof as defined in the claims. Although the invention has been described with particular reference to an osmometer, e pressure measuring system can be used in many other ways such as in connection with vacuum gauges, microbarometers, infrared analyzers, blood pressure measurement, biotelemeters, shock tube studies, turbulence measurements, altimeters, rate of climb indicators, and measurements at high temperatures or in difficult environments.

Accordingly, the invention is not to be limited to the particular embodiments disclosed, but only by the claims wherein what is claimed is:

1. A pressure measuring system including
   pressure sensitive, reflective membrane means,
   a light source illuminating said membrane means,
   means defining a chamber and having at least one open end, the membrane means being supported by the means defining a chamber and closing an open end thereof, whereby changes in fluid pressure within the chamber alter the shape of the membrane thereby varying the amount of reflected light, and sensor means for detecting varying amounts of reflected light received from said membrane means in response to altered shape of said membrane means, said sensor means including at least two photosensitive detectors connected in a bridge circuit exhibiting diagonal bilateral asymmetry.

2. The pressure measuring system of claim 1 wherein said two photosensitive detectors are positioned with respect to said membrane means so that the bridge normally can be balanced only when it is asymmetrically illuminated whereby the sensor exhibits a greater response to a change in illumination from an unfocused light reflection than a sensor containing a diagonally bilaterally symmetric bridge.

3. The pressure measuring system of claim 2 wherein unequal areas of the photosensitive detectors are exposed to the reflected light.

4. The pressure measuring system of claim 3 including a mask blocking part of the surface area of one of the photosensitive detectors whereby unequal areas of the photosensitive detectors are exposed to the reflected light.

5. The pressure measuring system of claim 4 wherein the mask is shaped to follow a line of constant illumination on the surface of the photosensitive detector.

6. The pressure measuring system of claim 2 wherein the photosensitive detectors are of unequal sensitivity.

7. The pressure measuring system of claim 2 wherein one photosensitive detector is shielded from light reflected from the membrane means and exposed to light from the light source.

8. The pressure measuring system of claim 5 including means for reflecting light from the light source to the shielded photosensitive detector.

9. The pressure measuring system of claim 7 including means for controlling the amount of light received by the shielded photosensitive detector.

10. The pressure measuring system of claim 2 including four photosensitive detectors, each connected in a separate arm of the bridge and positioned proximate said membrane means so that the change of illumination with change of pressure being sensed is not the same on all four photosensitive detectors.

11. The pressure measuring system of claim 10 wherein the photosensitive detectors are arranged in two groups, the detectors in each group being from opposite sides of the bridge and unequal areas of the two groups are exposed to the reflected light.

12. The pressure measuring system of claim 11 including a mask blocking part of the surface area of one of the photosensitive detectors whereby unequal areas of the photosensitive detectors are exposed to the reflected light.

13. The pressure measuring system of claim 12 wherein the mask is shaped to follow a line of constant illumination on the surface of the photosensitive detector.

14. The pressure measuring system of claim 10 wherein the photosensitive detectors are arranged in two groups and one group is shielded from light reflected from the membrane and exposed to light from the light source.

15. The pressure measuring system of claim 14 including means for reflecting light from the light source to the shielded group of photosensitive detectors.

16. The pressure measuring system of claim 14 including means for controlling the amount of light received by the shielded group of photosensitive detectors.

17. The pressure measuring system of claim 14 wherein unequal areas of the photosensitive detectors in the shielded group are exposed to the light.

18. The pressure measuring system of claim 14 including:
   a. a fifth photosensitive detector connected with one of the photosensitive detectors and shielded from light reflected from the membrane and exposed to light from the light source; and
   b. means for controlling the amount of light received by the fifth photosensitive detector so that variations in brightness of the source light can be compensated.

19. The pressure measuring system of claim 10 wherein the photosensitive detectors are arranged in two groups, the photosensitive detectors in each group being of unequal sensitivity.

20. The pressure measuring system of claim 2 including means for splitting the reflected light between the photosensitive detectors.

21. The pressure measuring system of claim 20 wherein the splitting means is a wedge shaped double mirror.

22. The pressure measuring system of claim 2 wherein two adjacent arms of the bridge do not contain photosensitive detectors and are unequal in impedance.

23. The pressure measuring system of claim 1 wherein the photosensitive detectors are connected in opposite arms of the bridge.

24. The pressure measuring system of claim 23 wherein the change of illumination with change of pressure being sensed is in the same direction on the two photosensitive detectors.

25. The pressure measuring system of claim 1 including four photosensitive detectors, each connected in a separate arm of the bridge and arranged so that the change of illumination with change of pressure being sensed is not the same on all four photosensitive detectors.

26. The pressure measuring system of claim 25 wherein the photosensitive detectors are arranged in two groups, and one group is shielded from light reflected from the membrane means and exposed to light from the light source.

27. The pressure measuring system of claim 26 wherein the number of photosensitive detectors in each group are unequal.

* * * * *